United States Patent
Ward

[11] 3,766,881
[45] Oct. 23, 1973

[54] TRAFFIC WARNING DEVICE

[75] Inventor: Richard W. Ward, Westchester, Ohio

[73] Assignee: K. D. Lamp Company, Cincinnati, Ohio

[22] Filed: Mar. 29, 1973

[21] Appl. No.: 345,857

[52] U.S. Cl.............. 116/63 P, 40/125 N, 404/10
[51] Int. Cl................................................ E01f 9/10
[58] Field of Search ......................... 116/63, 63 P; 40/125 N; 404/10; 350/97

[56] References Cited
UNITED STATES PATENTS

| | | | |
|---|---|---|---|
| 3,589,328 | 6/1971 | Kiniry et al......................... | 116/63 P |
| 3,593,681 | 7/1971 | Sernovitz............................ | 116/63 P |
| 3,600,059 | 8/1971 | Evans.................................. | 350/97 |

FOREIGN PATENTS OR APPLICATIONS

| | | | |
|---|---|---|---|
| 1,052,406 | 12/1966 | Great Britain...................... | 116/63 P |
| 1,934,656 | 3/1971 | Germany............................ | 116/63 P |
| 1,958,255 | 5/1971 | Germany............................ | 116/63 P |
| 140,542 | 5/1953 | Sweden.............................. | 350/97 |

Primary Examiner—Louis J. Capozi
Attorney—James S. Hight et al.

[57] ABSTRACT

A portable traffic warning device to warn oncoming drivers of an accident or a stopped vehicle in the traffic lane or on the side of the highway. The device is constructed of three pivotally joined elongated members with an integrally formed and pivotally attached stand, the elongated members and stand being foldable for compact storage. Each elongated member includes a light reflecting portion and a fluorescent portion. The reflective portion preferably comprises a retroreflector member while the fluorescent portion comprises a surface coated with a fluorescent material, such as a fluorescent paint. The fluorescent portion is louvered to permit air to flow freely therethrough while being shaped to prevent light from passing therethrough.

8 Claims, 8 Drawing Figures

PATENTED OCT 23 1973 3,766,881
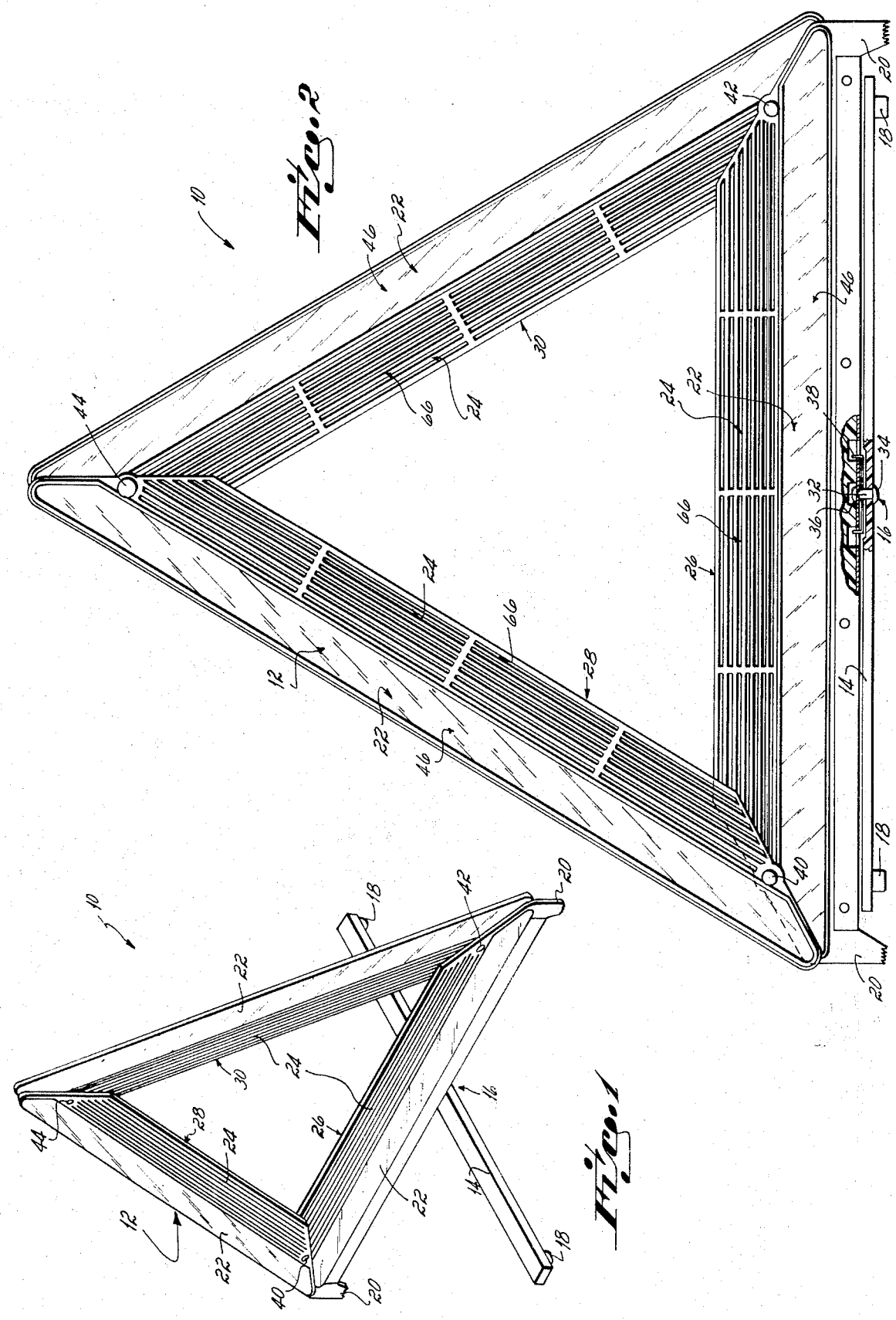

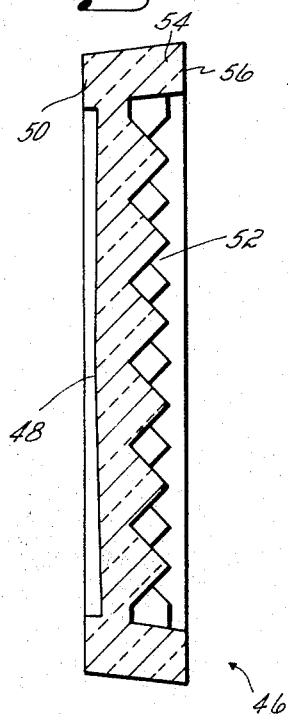
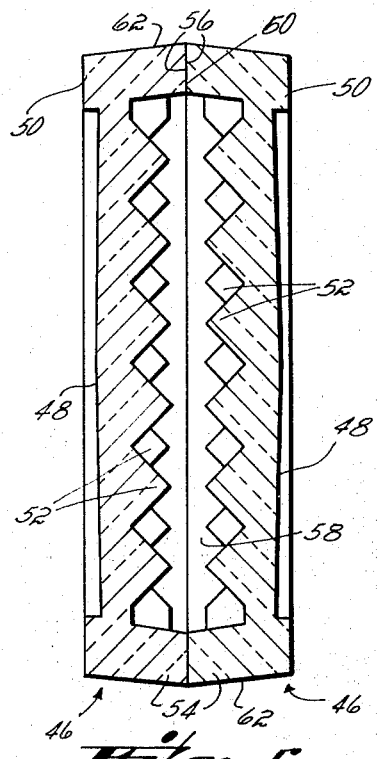

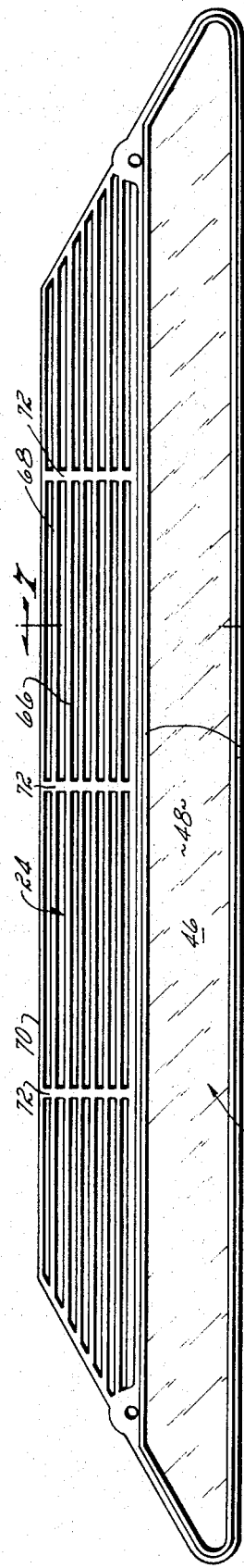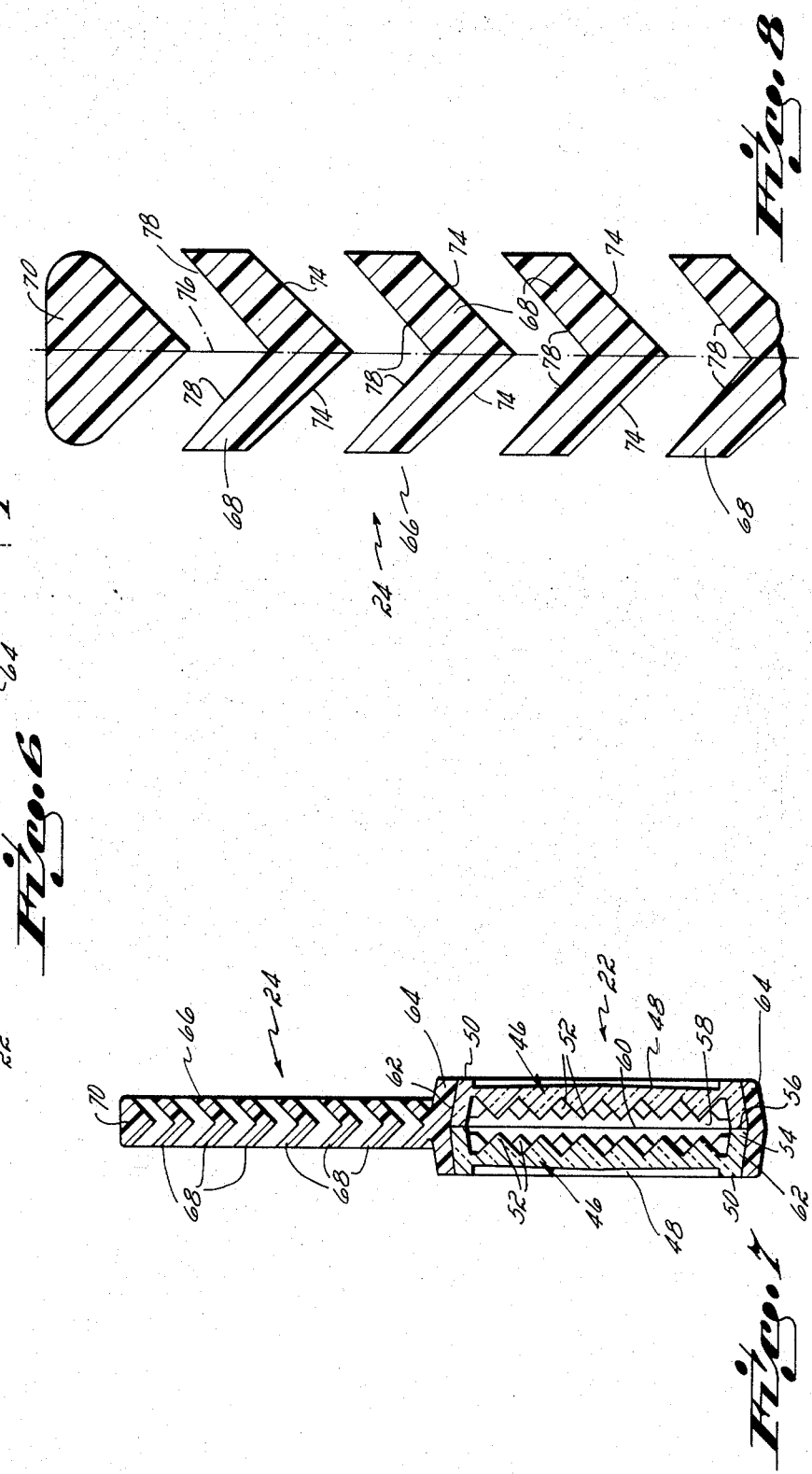

TRAFFIC WARNING DEVICE

The present invention relates to a portable traffic warning device and more specifically to a foldable warning device adapted for use by motorists at the side of highways for warning oncoming drivers of an accident or of a stopped vehicle ahead either in the lane of travel or on the side of the road.

In the field of portable traffic warning devices, numerous types of warning devices have been devised for warning approaching drivers of a danger ahead. One of the most frequently used devices is a flare which is supported by some form of support means so that the flare can be located at the edge of the road to warn oncoming drivers of the danger ahead. These flares are typically ignited by a match or, in some cases, they may be ignited with a specially provided striking plate. After being ignited, such flares typically burn for 30 minutes. Should the danger be removed from the highway before the 30 minute period has elapsed, the flares are normally left to burn out because they cannot be extinguished easily. Under such circumstances, approaching drivers will see the flare and adjust their driving unnecessarily in anticipation of some danger further down the road. This driver reaction to a flare burning after the danger has been removed may, in itself, create a traffic hazard or even cause an accident. Therefore, it is highly undesirable to use flares as a warning device because the warning signal cannot be turned off after the danger has been removed from the highway.

A further problem associated with flares as warning devices is that they burn for only 30 minutes. Should the hazard remain after the 30 minute burning time has elapsed, an additional flare must be lighted to warn oncoming traffic of the road hazard. In addition to the problem of requiring ignition of new flares every 30 minutes, the flare itself presents a fire hazard when it must be placed alongside a road where dry grass and leaves may have collected. Yet another problem is that a flare may be extinguished by rain or snow. Consequently, using flares to warn oncoming traffic of dangers ahead is an approach which itself is hazardous.

To overcome the problems of using flares as a warning device, various types of reflectors have been developed to serve the same function as flares. Typically, these reflectors are mounted on some form of frame or stand and are placed alongside of the road to warn oncoming traffic of danger ahead. These reflectors typically comprise retroreflectors or signs painted with a reflective paint. These devices are especially useful during the nighttime because they are good at reflecting the light from the headlights of an oncoming vehicle so as to attract the attention of the driver. Reflectors of this type, however, have not been completely satisfactory for a number of reasons. In the first place, these reflectors are often quite small in size resulting in little if any light being reflected to attract the attention of the driver at night. Additionally, during the day, these small reflectors are not easily seen by approaching drivers because of their small size. To overcome these difficulties, larger reflectors were designed. However, when the size of the reflector is increased, the reflector itself is more easily blown over by the wind produced by passing vehicles.

In light of the foregoing problems with previously known portable traffic warning devices, it is a primary object of this invention to provide a traffic warning device which can be erected on or near a roadway to warn approaching drivers of danger ahead wherein the warning device itself is constructed of materials for reliably attracting the attention of approaching drivers during all driving conditions and constructed in such a manner as to resist being blown over by wind gusts from passing traffic and the like.

It is a further object of this invention to provide a foldable, portable traffic warning device with a reflective portion and fluorescent portion for attracting the attention of approaching drivers during either the day or night.

It is still another object of the invention to provide a foldable, portable traffic warning device with a light reflecting portion and a fluorescent portion for attracting attention of approaching drivers, the warning device permitting air to flow freely through a portion thereof to resist being blown over by the wind while preventing light from passing therethrough.

To achieve these and other objects, features and advantages of the present invention, a preferred embodiment of this invention includes three elongated members pivotally joined together to permit the formation of an equilateral triangular sign. The sign is supported by a foldable stand. The elongated members and the stand may be folded together for compact storage. Each elongated member is constructed of two distinct members, one member being a light reflective member and the second member comprising a fluorescent coated member.

The reflective member, in the preferred embodiment, comprises two reflex lens members positioned in mating relationship to provide a light reflecting member on either side of each elongated member. Each of the lens members has a prismatic surface. These surfaces face inwardly, i.e., toward one another. A frame, which also constitutes the fluorescent member, is molded around the lens members to provide a hermetic seal for the lens assembly as well as a mechanical frame. Such a seal is highly advantageous since dust collecting on the prisms would adversely affect the reflex property of the lenses.

The fluorescent member preferably includes a louvered portion remote from the lens member to permit air to pass freely therethrough. However, the louvers are shaped so that light from the headlights of an automobile, truck or other vehicle cannot pass through the louvers, thereby producing a light opaque member which is coated with a flourescent material. This construction substantially increases the likelihood of being seen by approaching drivers while providing a warning device shaped to reduce the likelihood of being blown over by the wind.

The above and other objects, features and advantages of the present invention will become more clear from the following, more particular description of preferred embodiments of the invention as shown in the drawings which form a part of the disclosure wherein:

FIG. 1 shows a perspective view of the warning device in its self-supporting position;

FIG. 2 is a side elevational view of the warning device positioned to form an equilateral triangular sign;

FIG. 3 is a detailed side elevational view of the reflective member;

FIG. 4 is a vertical sectional view taken along section line 4—4 of FIG. 3;

FIG. 5 is a vertical sectional view showing two reflective members in mating position;

FIG. 6 shows in detail a side elevational view of an elongated member including the reflective and louvered members;

FIG. 7 shows a vertical sectional view taken along section line 7—7 of FIG. 6; and FIG. 8 is a detailed vertical sectional view of the louvered portion showing V-shaped slats.

In general, one preferred form of portable traffic warning device 10 of the present invention includes three elongated members which can be set up in a triangular configuration. Two such members are pivotally joined at one end to the third elongated base member. Each of the three elongated members contain two distinct though integrally connected portions, the first portion being a light reflective portion and the second portion being opaque to light and coated with a fluorescent material and formed to permit air to flow freely therethrough to substantially reduce the wind resistance of each elongated member.

Referring now to FIG. 1, a portable traffic warning device 10 is shown in its self-supporting position. The warning device itself includes a surface 12 designed, in accordance with the present invention to be placed facing oncoming traffic, to attract the attention of approaching drivers and warn them of a dangerous condition ahead. Positioned in a plane perpendicular to the surface 12 is a support leg 14 which is pivotally attached at point 16 to the warning device 10. The support leg 14 has ground engaging feet 18 disposed at opposite ends thereof. The warning device itself includes two other ground engaging feet 20 which extend downwardly from the warning device along a line at right angles to leg 14. Thus, the device is self supporting.

In order to attract the attention of an oncoming driver, the warning device 10 includes an outer triangular band 22 which, in a preferred embodiment, comprises a red light reflecting region. The device 10 also includes an inner triangular band 24 which, in a preferred embodiment, comprises an area coated with an orange fluorescent material and is opaque to light. In combination, the outer band 22 and the inner band 24 are constructed to reflect or creat sufficient light intensity to attract the attention of approaching drivers whether during the daytime or during the night.

Referring now to FIG. 2, the portable warning device of this invention is shown in even greater detail with its support leg 14 pivoted to a storage position parallel to the elongated members 26, 28 and 30. The support leg 14 itself may comprise a member formed of a rigid plastic, metal or other suitably rigid material. Mounted at opposite ends of the support leg 14 are feet 18 which preferably comprise a circular disc or the like, formed from rubber or similar flexible material. These feet 18 contact the support surface and help prevent the warning device from sliding across the support surface.

The support leg 14 is pivotally attached to base member 26 at its center point 16 by a pin 32 about which the support leg 14 is rotatable. At the lower end of the pin 32 is a head 34 of larger diameter than the pin 32 for preventing the support leg 14 from falling off the pin 32. At the upper end of the pin 32 is another head 36 which is also of larger diameter than the pin 32 and which is embedded in the horizontally disposed base member 26 to thereby secure the support leg 14 to the base member. A spring detent means 38 is provided in combination with the support leg 14 and base member 26 to releasably hold the support leg 14 in its support position shown in FIG. 1.

In the preferred embodiment of the present invention, the portable warning device includes three substantially identical members 26, 28 and 30. Elongated member 26 is the lowermost, horizontal, or base member. The two additional elongated substantially planer members 28 and 30 are pivotally attached to the ends of base member 26 at pivot points 40 and 42 respectively. Pivots 40 and 42 can be of any suitable type which permit the elongated members 28 and 30 to be rotated from a storage position parallel to base 26 to an upstanding triangular position as shown in FIG. 1. In a preferred embodiment of the present invention, the pivots 40 and 42 comprise rivets which pass through the base 26 and members 28 and 30 respectively.

The elongated members 26, 28 and 30 are preferably of substantially the same length to permit the formation, upon unfolding the elongated members 28 and 30, of an equilateral triangle as shown in FIG. 2. To lock the elongated members in this position, members 28 and 30 have their free ends releasably held in the position by a snap clip 44 or the like. To fold the warning device shown in FIG. 2, the snap clip 44 is disengaged to permit the elongated members 28 and 30 to be rotated about their respective pivot points 40 and 42 into parallel relation with the base member 26. When so folded, the warning device is easily stored in a compact carrying case or a suitably small area.

It will be understood that the equilateral triangular shape of the warning device as shown in FIG. 2 is merely exemplary of one preferred embodiment of the present invention, and that other shapes are contemplated. For example, additional elongated members might be attached to the three elongated members shown to form a square, a pentagon, and other geometrical shape. For each such other shape, the elongated members are preferably formed in accordance with this invention as hereinafter described in greater detail.

Each of the elongated members 26, 28 and 30 comprise two different portions, the first portion 22 being a light reflecting portion and the second portion 24 being a fluorescent coated, light opaque member constructed to reduce wind resistance. The two portions 22 and 24 are separately but integrally formed.

The reflector portion 22 is shown in greater detail in FIGS. 3–5 and is preferably formed from a pair of moulded single piece red acrylic reflex lens members 46, trapezoidal in shape. Each reflex lens member 46 includes a substantially planar surface 48 with a raised flange 50 forming a perimeter around the surface 48 on one side thereof. On the other side of each reflex lens member 46, as best shown in FIG. 4, are a plurality of light reflecting prisms 52. These prisms 52 are formed in a manner well known in the construction of retroreflectors. Each reflex lens member 46 is operative to reflect light entering the reflex lens member 46 toward the light source.

In a preferred embodiment of the present invention, a reflecting band 22 is provided on opposite sides of the traffic warning device to reflect light toward its source whether directed at the warning device from one side or the other. To accomplish this objective, two reflex lens members 46, of the type shown in FIG. 4, are positioned together in mating manner as shown in FIG. 5 with their prisms 52 facing inwardly so that light directed toward either reflex lens member 46 will be reflected thereby toward its source. Each of the reflex members includes a peripheral flange 54 integrally formed therewith which extends completely around the prisms 52 and includes a flat surface 56 formed to exactly mate with the flat surface 56 of another reflex lens member 46. By disposing two reflex lens members 46 in mating manner as shown in FIG. 5, a slight space 58 is formed between the inwardly directed prisms.

In order to maintain the two reflex lens members 46 in the position shown in FIG. 5, the surfaces 56 are held together by sonic welding or by a double backed adhesive positioned between the two flat surfaces 56.

When two reflex lens members 46 are disposed as shown in FIG. 5, a mating seam 60 is formed between the reflex lens members 46 which extends completely around the two reflex lens members 46. While this seam is sealed by an adhesive or weld between the mating surfaces 56, it is advantageous to further seal this mating seam 60 to insure that moisture and dust do not collect in the gap 58 between the two mating reflex lens portions 46. To achieve this added sealing and to structurally hold the two reflex lens portions 46 in position, a single moulded frame is formed around the periphery 62 of the reflex lens members 46.

In a preferred embodiment, this frame 64 comprises a high impact styrene which is moulded around the reflex lens members. As viewed in the vertical sectional view of FIG. 7, the single moulded piece of styrene 64 forms a ring encompassing the lens members in intimate contact with their peripheral surfaces 62. The moulded styrene 64 is thus effective to form a seal to prevent moisture and dust from entering the gap 58 between the two lens reflex portions 46. The encircling ring 64 also mechanically holds the two reflex lens portions 46 in the position shown in FIG. 7. To facilitate this, each reflex lens member 46 is shaped so that each outer wall 64 slopes, preferably at an angle of about 7°.

Extending upwardly from the reflex lens encircling ring 64 and integrally formed therewith is a louvered body 66 which, in a preferred embodiment, is coated with or incorporates an orange fluorescent material. This louvered body 66 is formed with a plurality of slats 68 which are shaped to permit air to pass freely therethrough. However, the slats 68 are also shaped in a manner to prevent light from passing directly therethrough so that the louvered body 66, as viewed from a distance, will be light opaque. By providing a louvered body 66 instead of a solid body, the wind resistance of each elongated member is substantially reduced because air can freely flow through the openings between the slats 68.

Referring now to FIG. 8, a detailed vertical sectional view of the louvered body 66 is shown. Each slat 68, in the preferred embodiment, comprises, in cross-section, a substantially V-shaped member which is supported on at least one end by a support rib 72. Each slat 68 has two lower surfaces 74 which extend away from the center line 76 of the slat at an angle of approximately 45°. In addition, each slat 68 includes two upper surfaces 78 which also extend away from the center line 76 in opposite directions at an angle of approximately 45°. The slats 68 thus form a light opaque body which provides a solid visual appearance but which freely allows air to pass therethrough.

While the foregoing description has been made with particular emphasis on a preferred embodiment thereof, it will be understood by those of skill in the art that numerous modifications in form only can easily be made without departing from the spirit and scope of the present invention as defined by the following claims.

What is claimed is:

1. A portable traffic warning device comprising, in combination:

a substantially planer light reflecting member for reflecting light in a direction substantially opposite to the direction of light striking the light reflecting member; and a louvered member coplanar with and extending from said light reflecting member, said louvered member being shaped to permit air to flow freely therethrough to reduce wind resistance of the warning device, said louvered member also being shaped to be light opaque and having fluorescent material associated therewith.

2. The portable traffic warning device in claim 1 wherein said light reflecting member comprises:

a pair of molded, substantially planar reflex lens portions, each reflex lens portion comprising a single molded piece of light transmitting material with reflex prisms on one side thereof, each prism forming a light reflector, said pair of molded reflex lenses being positioned in mating manner with mating surfaces of each reflex lens portion substantially in contact with each other to form a mating seam so that all said reflex prisms are disposed between both said reflex lens portions.

3. The portable traffic warning device in claim 2 wherein said louvered member includes a single molded piece of material formed to completely seal said mating seam to provide an airtight seal therefor to prevent moisture and dust from collecting on said reflex prisms.

4. A portable traffic warning device comprising, in combination:

a plurality of elongated members pivotally joined at least at one end to another elongated member, each said elongated member comprising:

a. a pair of molded, substantially planar reflex lens members, each reflex lens member comprising a single molded piece of light transmitting material with reflex prisms on one side thereof forming a light reflector, said pair of molded reflex lens members being positioned in mating manner with mating surfaces of each reflex lens portion substantially in contact with each other to form a mating seam so that all said reflex prisms are disposed between both said reflex lens members;

b. a single molded piece of material for completely sealing the mating seams of said pair of reflex lens members to provide an airtight seal therefor to prevent moisture and dust from collecting on said reflex prisms, said single molded piece including a louvered body disposed in a plane substantially the same as the plane containing said mating seams of said pair of reflex lens portions, said louvered body having a plurality of slats disposed to permit air to flow freely through said louvered body while preventing light directed at said louvered body from passing therethrough.

5. A portable triangular traffic warning device comprising:

three elongated members, the first of said members constituting a base member and the second and third members being pivotally joined to the ends of said base member;

each of said elongated members comprising a light reflecting portion and a fluorescent portion;

said light reflecting portion comprising two parallel reflex lens members;

each of said lens members having a prismatic surface, the prismatic surfaces facing inwardly in opposition to one another;

said fluorescent portion being disposed adjacent said lens portions and having a portion extending around said lens members to provide a frame and peripheral seal therefor;

and means releasably connecting the ends of said second and third means together to form a triangle.

6. The traffic warning device of claim 5 in which said base member carries ground engaging feet adjacent to the ends thereof, and a support member is pivotally mounted to the base member and adapted to be extended at right angles thereto.

7. The traffic warning device of claim 6 in which said fluorescent portion is provided with a plurality of louvers for the passage of air therethrough.

8. The traffic warning device of claim 7 in which said louvers are configurated and disposed so that said fluorescent portion appears opaque.

* * * * *